(12) United States Patent
Qu et al.

(10) Patent No.: US 11,845,148 B2
(45) Date of Patent: Dec. 19, 2023

(54) DEVICE AND METHOD FOR AUTOMATIC NARROW GAP TIG WELDING

(71) Applicants: Bo Qu, Vaughan (CA); Jianjun Wang, Vaughan (CA); Yalin Jiang, Vaughan (CA)

(72) Inventors: Bo Qu, Vaughan (CA); Jianjun Wang, Vaughan (CA); Yalin Jiang, Vaughan (CA)

( * ) Notice: Subject to any disclaimer, the term of this patent is extended or adjusted under 35 U.S.C. 154(b) by 690 days.

(21) Appl. No.: 17/060,961

(22) Filed: Oct. 1, 2020

(65) Prior Publication Data

US 2021/0016379 A1  Jan. 21, 2021

Related U.S. Application Data

(63) Continuation-in-part of application No. PCT/CN2018/114860, filed on Nov. 9, 2018.

(30) Foreign Application Priority Data

Jul. 27, 2018  (CN) .......................... 201810844235.7

(51) Int. Cl.
  *B23K 9/02*  (2006.01)
  *B23K 33/00*  (2006.01)
  *B23K 37/02*  (2006.01)

(52) U.S. Cl.
  CPC ............ *B23K 9/0213* (2013.01); *B23K 33/00* (2013.01); *B23K 37/02* (2013.01)

(58) Field of Classification Search
  CPC ...... B23K 33/00; B23K 37/02; B23K 9/0213; B23K 9/0216; B23K 9/167

USPC .......................................................... 219/75
See application file for complete search history.

(56) References Cited

U.S. PATENT DOCUMENTS

2015/0076120 A1* 3/2015 Pagano ................ B23K 9/0216
                                                        219/124.1

FOREIGN PATENT DOCUMENTS

| CN | 201493625 U | 6/2010 |
|---|---|---|
| CN | 101767242 A | 7/2010 |
| CN | 104128697 A | 11/2014 |
| CN | 104289799 A | 1/2015 |
| CN | 105834554 A | 8/2016 |
| CN | 108746942 A | 11/2018 |
| JP | S5536104 A | 3/1980 |

* cited by examiner

*Primary Examiner* — Dana Ross
*Assistant Examiner* — James F Sims, III
(74) *Attorney, Agent, or Firm* — NKL Law; Allen Xue

(57) ABSTRACT

A welding device includes a welding torch having an electrode, an oscillation assembly having an oscillation shaft, and a connection member. The welding torch is affixed to the connection member at a first point and the oscillation shaft is affixed to the connection member at a second point. An extension of the axis of the oscillation shaft intersects with the axis of the welding torch at an intersection point. The distance from the intersection point to the tip of the electrode is less than a distance from the first point on the connection member to the tip of the electrode. During operation, the oscillation in the oscillation shaft is transferred through the connection member to the welding torch and causes pendulum type oscillations in the welding torch with the intersection point serving as the pivot point of the oscillation.

14 Claims, 6 Drawing Sheets

DEVICE AND METHOD FOR AUTOMATIC NARROW GAP TIG WELDING

RELATED APPLICATION

This application is a continuation-in-part of International patent application No. PCT/CN2018/114860, filed Nov. 9, 2018, which claims the benefit of priority to Chinese Patent Application No. 201810844235.7, filed on Jul. 27, 2018, the entire content of which are incorporated herein by reference.

BACKGROUND

1. Field of Technology

This disclosure relates to the technical field of narrow gap welding, specifically to a method and device for narrow gap welding using a pendulum type oscillation Tungsten Inert Gas (TIG) welding torch for narrow gap automation TIG Welding, also known as Gas Tungsten Arc Welding (GTAW).

2. Description of Related Art

Narrow gap welding equipment for joining medium and thick metal plates and narrow gap automatic all-position (5G) TIG welding equipment for joining metal pipes have been used in a large number of welding projects. Narrow gap TIG welding is of excellent welding quality, high welding efficiency, and significantly reduces consumption of the welding material. However, lack of sidewall fusion is a constant issue with narrow gap welding, which besets the fabrication industry. Even though lack of sidewall fusion may be reduced by adjusting welding parameters, it has not been completely resolved.

As to the terminology, a narrow gap is generally defined by the ratio of the weld groove depth (H) to the width of the groove top opening (W). When the depth to width ratio (H/W) of a weld groove is greater than a certain value (e.g., 1.5) and the groove top opening width W is less than or equal to certain value (e.g., 20 mm), the welding is often referred to as narrow groove welding. When the weld groove depth-to-width ratio (H/W) is greater than, e.g., 2.5, and the top opening width is less than or equal to, e.g., 20 mm, such a welding is often called narrow gap welding. In this disclosure, narrow gap welding and narrow groove welding are used interchangeably unless noted otherwise.

Nowadays there are two types of torch oscillation methods in narrow gap automatic TIG welding. One is linear oscillation and the other is pendulum oscillation. Linear oscillation refers to the scenario in which the tungsten electrode of a TIG torch moves left and right or back and forth in a lateral and one-dimensional displacement movement inside a weld groove. The linear oscillation welding entered the market earlier and has been widely used. However, when welding in a narrow gap, especially at a high welding speed, defects due to lack of sidewall fusion are persistent.

Pendulum type oscillation refers to the situation in which the tungsten electrode of the TIG torch swings from side to side about an oscillation pivot at a certain amplitude, i.e., a certain oscillation radius, similar to the swing motion of a pendulum bob in a pendulum clock. The tip of the electrode at the end of the TIG torch swings inside the weld groove accordingly. Used herein, the term "oscillation radius" refers to the distance between the oscillation pivot point to the tip of the electrode. In the conventional pendulum welding method, the TIG torch is directly clamped onto the oscillation shaft of an oscillation assembly, in which the clamping point of the TIG torch and the shaft of the oscillation assembly is positioned on the axis of the oscillation shaft.

Narrow gap TIG welding using pendulum oscillation enhances sidewall fusion because the tip of the tungsten electrode remains close to the sidewall during the oscillation and generally points toward the sidewall during most of the swing path. When the tip of the electrode points to or is generally perpendicular to the sidewall, the center part of the arc discharge, which has the highest energy density, faces the sidewall so as to cause a better fusion between the filler metal and the sidewall metal.

Nevertheless, the pendulum oscillation welding has not been widely adopted in narrow gap welding due to certain structural constraints. Generally, the swing of the electrode tip in the conventional pendulum method could require an oscillation radius of 60 mm or more. Under narrow gap welding conditions, the vertical difference between the lowest point of the electrode tip and its highest point may not exceed 0.05 mm. In other words, when the tungsten electrode swings to the sidewall of the weld groove to the highest point, the angle formed between the tungsten tip and the sidewall is very small, e.g., 5° to 10°. Under such circumstances, the center zone of the electric arc with the highest energy density is far from being perpendicular to the sidewall so the energy from the electric discharge may dissipate and may not fully fuse the sidewall metal.

Accordingly, there is a need for apparatus and methods to improve the pendulum welding method to improve sidewall fusion so that they are more suitable for narrow groove welding and narrow gap welding.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one of the embodiment of the current disclose, a welding device has a welding torch having an electrode, an oscillation assembly having an oscillation shaft, and a connection member. The welding torch is affixed to the connection member at a first point and the oscillation shaft is affixed to the connection member at a second point. Further, an extension of the axis of the oscillation shaft intersects with the axis of the welding torch at an intersection point. The distance from the intersection point to the tip of the electrode is less than a distance from the first point on the connection member to the tip of the electrode. During operation, the oscillation in the oscillation shaft is transferred through the connection member to the welding torch and causes pendulum type oscillations in the welding torch with the intersection point serving as the pivot point of the oscillation.

In another embodiment of the current disclosure, the method for narrow gap welding includes the steps of: forming a weld groove on a workpiece; orienting the welding device to the workpiece so that the pivot point of oscillation of the welding torch is proximal to a root of the weld groove and the first point in the connection member is distal to the root of the weld groove; causing the welding torch to oscillate about the pivot point; and melting and filling a filler metal into the weld groove to form a weld joint.

In certain aspects of the current disclosure, the welding torch is a TIG welding torch. The electrode is a tungsten electrode. In other aspects of the current disclosure, the weld groove has a bevel angle in the range of 4° to 10°, for example, in the range of 6° to 8° and/or a depth of in a range of 5 mm to 40 mm.

In some embodiments, the distance between the pivot point and a tip of the tungsten electrode is less than 60 mm, such as 5 mm to 50 mm, or 20 mm to 40 mm.

In other embodiments, the distance between a tip of the tungsten electrode to a root of the weld groove is 1 mm to 3 mm.

Other features and aspects will be apparent from the following detailed description, the drawings, and the claims.

DESIGNATION OF REFERENCE NUMERALS IN THE DRAWINGS

Figure 1:
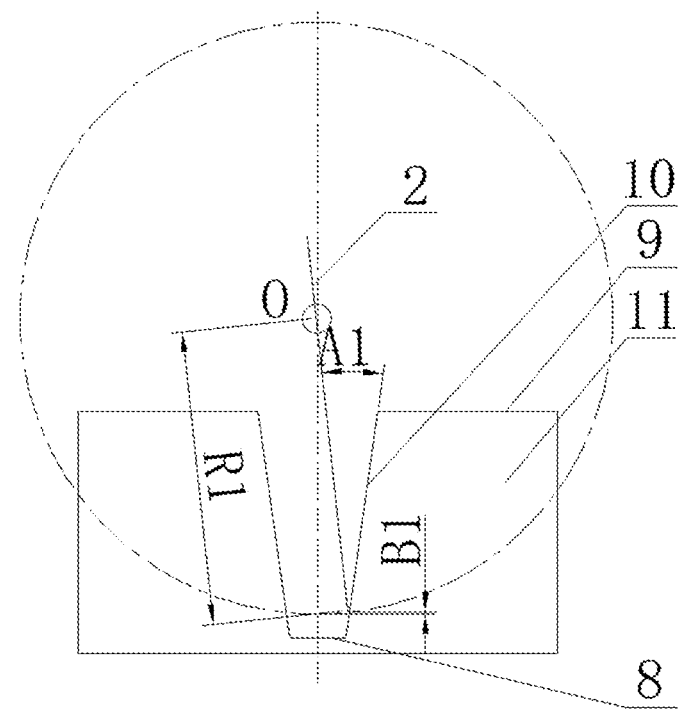
FIG. 1 is a schematic diagram of a conventional pendulum oscillation welding device.

1: TIG torch, 2: tungsten electrode, 2-1: tip of tungsten electrode, 3: clamping member, 4: connection member, 5: clamping member, 6: oscillation shaft, 7: oscillation assembly, 8: double bevel weld groove, 9: outer wall of workpiece, 10: sidewall, 11: workpiece, 12: filler metal (e.g. welding rod or welding wire), and O: pivot point of oscillation.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 2:
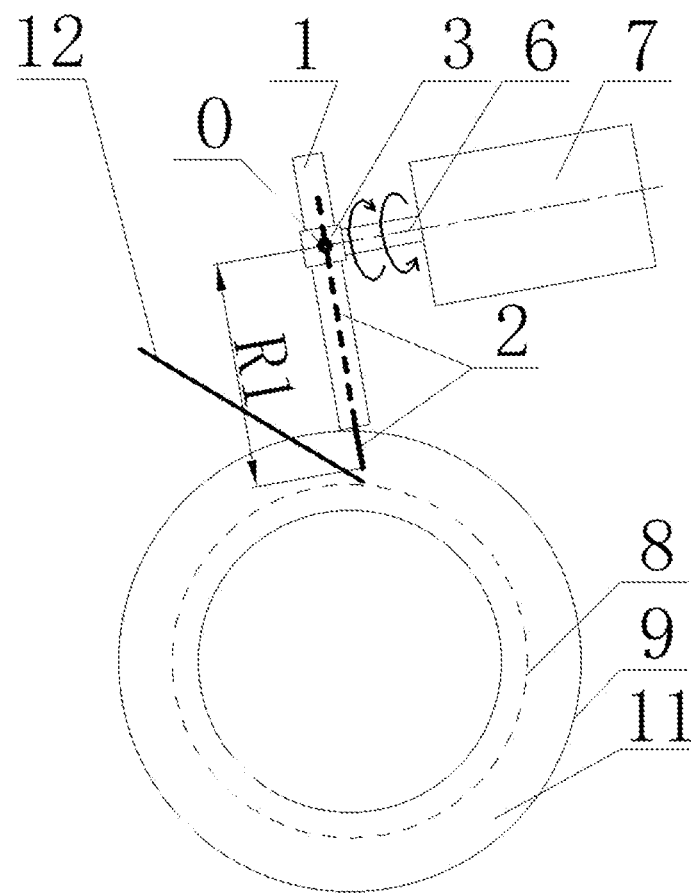
FIG. 2 is a side view of the device of FIG. 1 on a pipe joint.

FIGS. 1 and 2 provide schematic representations of a conventional pendulum oscillation welding device. The tungsten electrode 2 is inserted into TIG torch 1 with the tip of the electrode pointed to the double-bevel weld groove 8. The TIG torch 1 is directly clamped on to the oscillation shaft 6 of oscillation assembly 7 by clamp member 3. The oscillation movement initiated by the oscillation assembly 7 is converted into the left-and-right swing of the TIG torch 1 about the line perpendicular to the weld groove 8. The trajectory for the movement of the tip of the tungsten electrode 2 is a circular arc. The pivot point O is the origin of the circular arc.

FIG. 2 shows that the extension of the axis of the oscillation shaft 6 passes through the clamping member 3 as well as the pivot point O. The tip of filler rod or welding wire 12 (not shown in FIG. 1) is located near the tip of the tungsten electrode 2 and is melted by electric discharge during operation.

As shown in FIGS. 1 and 2, the radius of the circular arc—the oscillation radius—is R1. The vertical distance between the highest point the tip of tungsten electrode 2 reaches when the pendulum swing is at the maximum amplitude and when it is at the equilibrium position (i.e., the lowest point of the tip of the tungsten electrode 2 in the weld groove 8) is B1. At its maximum amplitude, the tungsten electrode 2 comes closest the sidewall without touching the sidewall, the angle between the tungsten electrode 2 and sidewall 10 is A1. Both B1 and A1 are relatively small.

Figure 3:
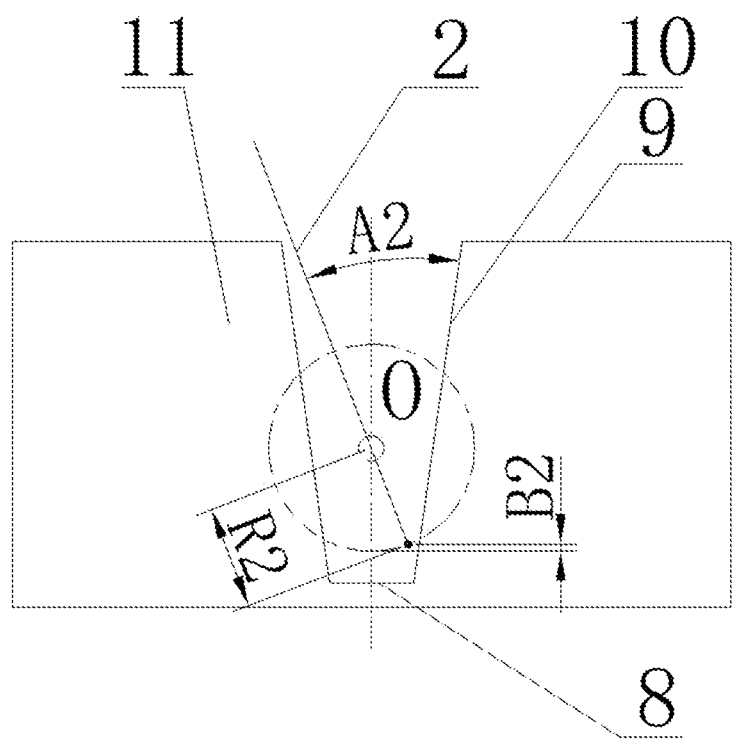
FIG. 3 illustrates an embodiment of pendulum oscillation welding device of the current disclosure.
Figure 4:
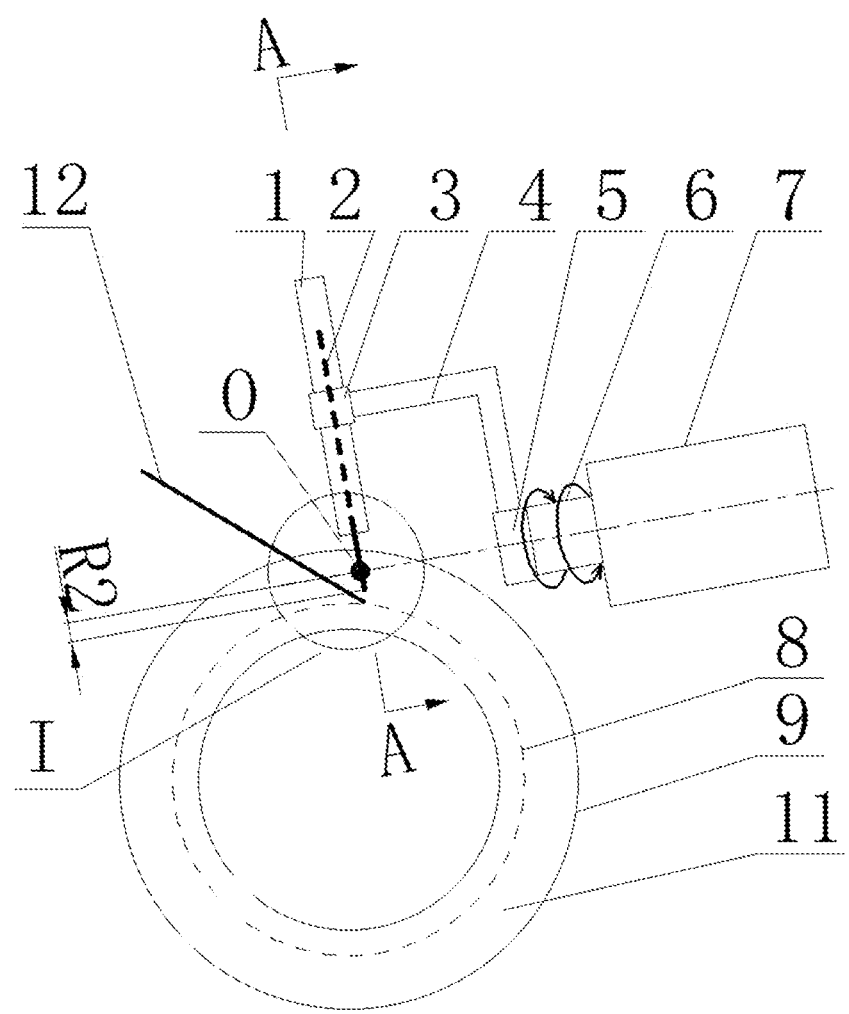
FIG. 4 provides a side view of the device of FIG. 3 on a pipe joint.

FIGS. 3 and 4 show an embodiment of the current invention. In this embodiment, the TIG torch 1 is connected to the oscillation shaft 6 through a connection member 4. In this embodiment, the connection member 4 is a rod having a bend about 90°. The first (upper) arm of the rod is connected to the TIG torch 1 by the clamping member 3, the second (lower) arm of the rod is clamped onto the oscillation shaft 6 by the clamping member 5. The rod is oriented in a certain position so that the first arm is positioned higher above the oscillation shaft 6 in the vertical direction.

In this embodiment, rotation in the oscillation shaft 6 swings the TIG torch 1 and the tungsten electrode 2 between two sidewalls 10 of the double-bevel weld groove 8. The pivot point O of the tungsten electrode 2, which is aligned with the axis of the oscillation shaft 6, is lowered into the weld groove 8, as shown in FIG. 3. Further, the radius of the circular arc, i.e., the oscillation radius, is R2. The vertical distance between the point where the tungsten electrode 2 is closest to sidewall 10 without touching it and the tip of the tungsten electrode 2 in the weld groove 8 at its equilibrium position is B2. Comparing FIG. 3 and FIG. 1, it can be readily appreciated that R2 is much smaller than R1 while B2 is much larger than B1. For example, B2 can be about 5 to 10 times as big as B1; A2 is about twice as large as A1 so that that the tip of the electrode 2 is at a larger angle (e.g., 15° to 25°) to the sidewall 10 when reaching its highest point at the end of its upward swing. Accordingly, the center of the electric arc which has the highest energy density is directed toward the sidewall 10 to accomplish a better sidewall fusion.

Figure 5:
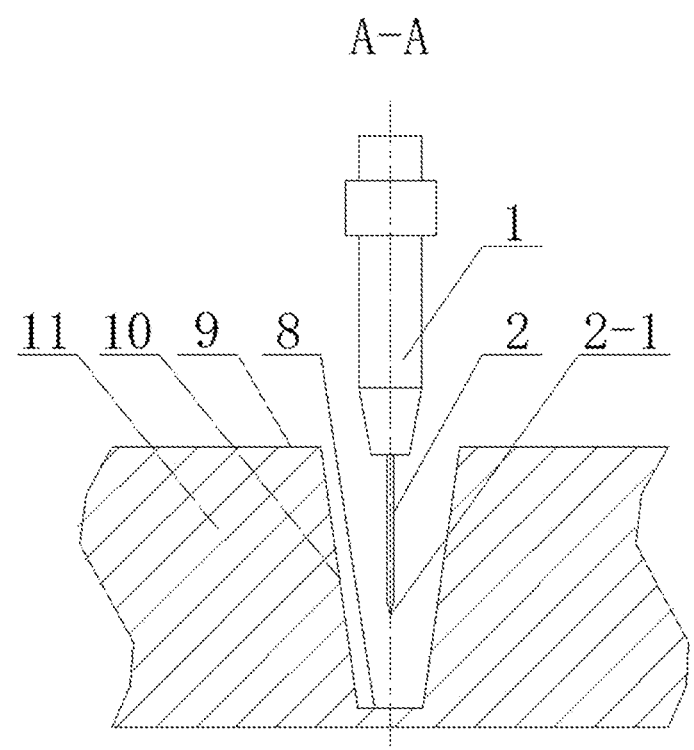
FIG. 5 is a view in the A-A direction of the device shown in FIG. 4.
Figure 6:
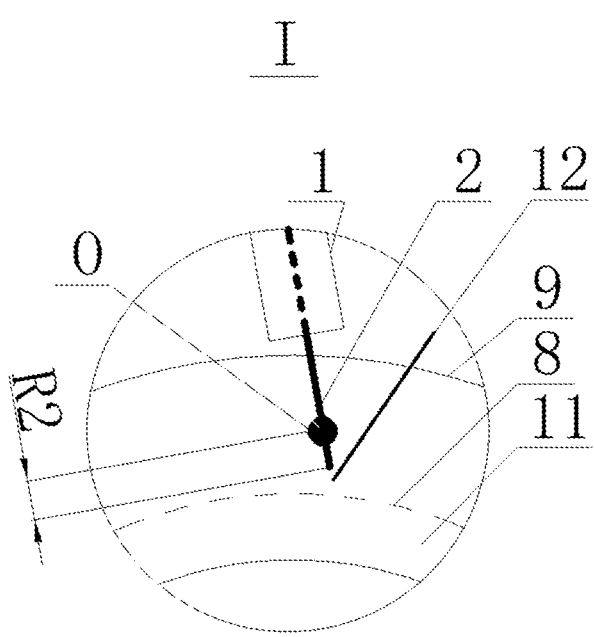
FIG. 6 is an enlarged view of a portion of FIG. 4, showing the details near tip of the tungsten electrode.

FIG. 5 is the view in the A-A direction in FIG. 4, which provides an enlarged view of the TIG torch 1. The tungsten electrode 2 has a tip 2-1 extending into the double-bevel weld groove 8. FIG. 6 presents the insert I in FIG. 4, more clearly showing the pivot point O in the proximity to the tip of the tungsten electrode 2. Note that the length of electrode 2 outside the TIG torch 1 can also be adjusted as needed.

The values of A2 and B2 vary according to the bevel angle and the depth of the weld groove, the length of the tungsten electrode outside the TIG torch, the position of the pivot point, etc. For example, a smaller bevel angle and a deeper weld groove both restrict the amplitude of the pendulum swing of the electrode so that both A2 and B2 would be smaller, while a shorter oscillation radius would allow larger A2 and B2.

The addition of a connecting member between the oscillation shaft 6 and the TIG torch 1 reduces the oscillation radius of the electrode 2 so that the pivot point O can be positioned closer to or even inside the weld groove. Further, since the pivot point of the tungsten electrode is aligned with the axis of the oscillation shaft, which is located outside the workpiece, the oscillation shaft can be oriented so that the tip of the tungsten electrode can be placed as close to or distant from the root of weld groove as needed provided that the oscillation shaft does not come into contact with the workpiece.

During operation, it is often desirable to maintain a length of the electric arc in the range of 1 mm to 3 mm, thereby focusing the electrical energy into the weld groove. A shorter distance is possible as long as the electrode tip does not touch workpiece. A longer distance is also operable provided that the length of the electric arc is not too long so that the energy becomes too dissipated and not able to maintain a good fusion between the filler material and the workpiece. Further, in such an embodiment, when the pivot point is located inside the weld groove, the oscillation radius is small enough so that a pendulum swing of the electrode can be maintained.

By shortening the tungsten electrode oscillation radius and maximizing the oscillation amplitude of the tungsten electrode, the angle between the axis of the tungsten electrode and the sidewall of the weld groove is increased and more filler metal can be effectively and sufficiently fused with the sidewall of the weld groove.

In one aspect of the current disclosure, the oscillation radius of the electrode is within the range of 0 mm to 60 mm. When the oscillation radius is 0 mm, the tip of the electrode does not oscillate. In certain embodiments of the disclosure, the oscillation radius is in the range of 5 mm to 60 mm, for example, in the range of 5 mm to 50 mm, or 20 mm to 40 mm. Further, in certain embodiment, the bevel angle of the weld groove can be as small as 4° (e.g. in the range of 4° to 10° or 6° to 8°) so that less filler material is needed.

The embodiment shown in FIGS. 3-4 has been subject to a large number of test in different welding positions, including 2G (horizontal welding), 3G (vertical welding), and 5G (all-position, or orbital welding), and on a variety of materials, such as high-strength steel, stainless steel, titanium alloy, 9Ni steel, bi-metal CRA (Corrosion-Resistant-Alloy) pipes with wall-thicknesses ranging from 6 to 45 mm. The testing results of these welds showed no defect due to lack of sidewall fusion. Moreover, the thickness filler metal for each pass has been increased from about 1.5 mm to 2 mm in the case of conventional oscillation method to about 2.5 mm to 4.5 mm using the embodiment shown in FIGS. 3-4 in this disclosure. Accordingly, both the welding efficiency and the welding quality were greatly improved.

Variations from the embodiment shown in FIGS. 3-4 are available. For example, the workpiece can be in a number of geometric shapes, from pipes to steel plates. The depth of the weld groove, which corresponds to the thickness of the workpiece, can be in the range of 5 mm to 50 mm or higher, for example, from 5 mm to 35 mm.

The connection member can be in various shapes as long as it allows the axis of the oscillation shaft and the pivot point of the tungsten electrode to be positioned closer to the weld groove root than the distance between the connection point between the connection member and the weld groove root. For example, the bend in the rod may be at a degree other than 90°, e.g., any degree from 80° to 150°. The connection member may also be a robotic arm that have one or more articulated joints and able to change angles of the joints.

Therefore, the scope of the disclosure is defined not by the detailed description, but by the claims and their equivalents, and all variations within the scope of the claims and their equivalents are to be construed as being included in the disclosure.

What is claimed is:

1. A welding device, comprising:
   a welding torch having an electrode, wherein a tip of the electrode is exposed;
   an oscillation assembly comprising an oscillation shaft; and
   a connection member,
   wherein the welding torch is affixed to the connection member at a first point and the oscillation shaft is affixed to the connection member at a second point,
   wherein an extension of an axis of the oscillation shaft intersects with an axis of the welding torch at an intersection point,
   wherein a distance between the intersection point to the tip of the electrode is less than a distance between the first point on the connection member to the tip of the electrode,
   wherein, during operation, an oscillation in the oscillation shaft is transferred through the connection member to the welding torch and causes a corresponding oscillation in the welding torch at a constant oscillation radius, and the intersection point is a pivot point of the oscillation, wherein the oscillation radius equals a distance from the pivot point and the tip of the electrode.

2. The welding device of claim 1, wherein the electrode is a tungsten electrode.

3. The welding device of claim 1, wherein the welding torch is a TIG torch.

4. A method for narrow gap welding, comprising:
   forming a weld groove on a workpiece;
   orienting the welding device of claim 1 to the workpiece so that the pivot point of oscillation of the welding torch is proximal to a root of the weld groove and the first point in the connection member is distal to the root of the weld groove;
   causing the welding torch to oscillate about the pivot point at the constant oscillation radius; and
   melting and filling a filler material into the weld groove to form a weld joint.

5. The welding method of claim 4, wherein the welding torch comprises a tungsten electrode.

6. The welding method of claim 5, wherein the welding torch is a TIG torch.

7. The welding method of claim 4, wherein a bevel angle of the weld groove is in the range of 4° to 10°.

8. The welding method of claim 4, wherein a depth of the weld groove in a range of 5 mm to 40 mm.

9. The welding method of claim 5, wherein the distance between the pivot point and the tip of the tungsten electrode is less than 60 mm.

10. The welding method of claim 9, wherein the distance between the pivot point and the tip of the tungsten electrode is between 5 mm to 50 mm.

11. The welding method of claim 9, wherein the distance between the pivot point and the tip of the tungsten electrode is between 20 mm to 40 mm.

12. The welding device of claim 1, wherein the oscillation radius is less than 60 mm.

13. The welding method of claim 1, wherein the oscillation radius is between 5 mm to 50 mm.

14. The welding method of claim 9, wherein the oscillation radius is between 20 mm to 40 mm.

* * * * *